US 6,465,769 B1

(12) United States Patent
Sakurai

(10) Patent No.: US 6,465,769 B1
(45) Date of Patent: Oct. 15, 2002

(54) FOCUS DETECTING DEVICE, AND APPARATUS HAVING THE SAME

(75) Inventor: Hiroshi Sakurai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/495,104

(22) Filed: Feb. 1, 2000

(30) Foreign Application Priority Data

Feb. 9, 1999 (JP) .......................................... 11-031101

(51) Int. Cl.⁷ .............................. G02B 17/02; H01J 3/14
(52) U.S. Cl. ........................ 250/216; 250/201.2; 396/97
(58) Field of Search .......................... 250/201.2, 201.4, 250/201.6, 201.7, 204, 216; 396/97, 111, 114, 529

(56) References Cited

U.S. PATENT DOCUMENTS 4,959,677 A * 9/1990 Suda et al.
6,055,122 A * 4/2000 Sugawara et al. ....... 360/78.11
6,300,611 B1 * 10/2001 Nakagawa ............... 250/201.2

\* cited by examiner

Primary Examiner—Stephone Allen
(74) Attorney, Agent, or Firm—Robin, Blecker & Daley

(57) ABSTRACT

A focus detecting device includes a focus detecting sensor having a glass plate affixed to a surface thereof, and a holding member which holds the focus detecting sensor. The holding member is provided with a first abutting surface on which the glass plate of the focus detecting sensor abuts, a second abutting surface on which a side surface of the focus detecting sensor abuts, and a groove, disposed between the first and second abutting surfaces, in which an adhesive for fixing the focus detecting sensor flows.

18 Claims, 7 Drawing Sheets

FOCUS DETECTING DEVICE, AND APPARATUS HAVING THE SAME

BACKGROUND OF THE INVENTION

1. Field of the Invention

The present invention relates to a focus detecting device and a method for positioning and fixing an optical member and a holding member holding the optical member.

2. Description of Related Art

The conventional arrangement of a focus detecting device necessitates a focus detecting sensor thereof to be swingable with respect to a reimaging lens secured to the body block of the focus detecting device for the purpose of performing positional adjustment such as adjustment of the optical axis and inclination of the focus detecting sensor.

To meet this requirement, a conventional focus detecting sensor of the type using a clear mold is, for example, arranged as described below. The clear mold used for the focus detecting sensor is first explained with reference to FIGS. 7(a) and 7(b).

FIG. 7(a) shows the clear mold in a plan view. FIG. 7(b) shows the clear mold in a sectional view taken on a line A–A' of FIG. 7(a).

Referring to FIGS. 7(a) and 7(b), a focus detecting sensor 301 is positioned at a lead frame 302 and connected to the lead frame 302 by wire bonding in a known manner. A clear mold 300 is formed by molding a transparent resin with the focus detecting sensor 301 and the lead frame 302 inserted therein to be packaged together.

The clear mold 300 has a transparent resin part 304. Lead parts 303 are formed integrally with the lead frame 302. The lead parts 303 are connected to a mounting member 305 by soldering or the like.

A glass plate 306 is applied to the clear mold 300 on the sensor side thereof so as to protect the optical path of the focus detecting sensor 301 from being damaged, because the optical path tends to be damaged if the transparent resin part 304 on this side of the clear mold 300 is left uncovered.

The clear mold 300 which is arranged in this manner is held in a position-adjustable state by a sensor holder which is adjustably aslant with respect to the reimaging lens. Therefore, the position of the clear mold 300 relative to the reimaging lens can be adjusted as desired. Further, the sensor holder is held by a body block of the focus detecting device in such a way as to permit adjustment of its position. The position of the focus detecting sensor is thus arranged to be adjustable with respect to the reimaging lens.

The arrangement described above thus permits adjustment of the focus detecting sensor to an optimum position relative to the reimaging lens by adjusting the relative positions of the focus detecting sensor and the sensor holder and those of the sensor holder and the body block of the focus detecting device. After the position of the focus detecting sensor is adjusted, the focus detecting sensor and the sensor holder are fixedly joined together by an adhesive while the body block of the focus detecting device and the sensor holder are fixedly joined together by bonding also with an adhesive.

It is a feature of the above-stated conventional arrangement that the bonding work on all these parts is performed after completion of position adjustment of the focus detecting sensor. Further, the conventional focus detecting sensor of the above-stated kind is arranged to use the clear mold 300. The clear mold 300 is mounted on the body bock of the focus detecting device in a state of being set on the sensor holder which is provided for holding the focus detecting sensor before the position adjusting work is performed. These parts are fixed by an instantaneous adhesive after the position adjustment. The clear mold package which serves as an outer packaging for the focus detecting sensor, the sensor holder which is arranged to fix the clear mold package and the body block of the focus detecting device which is arranged to fix the sensor holder are molded with plastic materials of the same kind. Therefore, they can be readily joined together with the instantaneous adhesive and yet to have a sufficient adhesive, or bonding, strength. The accuracy of automatic focusing, therefore, has been little affected by the adhesive strength. However, the use of the clear mold has presented some problems.

While the conventional focus detecting device thus excels in adhesive strength and accuracy of focus detection on one hand, it is extremely difficult to accurately position the focus detecting sensor 301 and the lead frame 302 in manufacturing the focus detecting device. Further, in molding the transparent resin part 304, dust and air foams tend to mix in the resin to greatly lower the yield of production. The poor yield causes an increase in cost. Further, the glass plate 306 must be used for protecting the lead part 303 and the side face of the sensor. The use of the glass plate 306 causes an increase in outside dimensions.

These problems may be solved by forming the focus detecting sensor in a chip-on-board package (hereinafter referred to as a COB package). The COB package has an advantages over the clear mold package in the following points.

The COB package is formed by sandwiching a focus detecting sensor chip mounted on a substrate (base board) between a glass plate and the substrate, and filling a space between the substrate and the glass plate with a resin material. Compared with the clear mold package, the COB package can be manufactured with a less degree of possibility of having dust and air foams mixed therein. Therefore, the COB package can be manufactured with better yield and at lower cost. Besides, a through-hole part which is used in the manufacture of the COB package can be used also as the lead part which is used for the clear mold. The COB package thus dispenses with the lead part. The use of the glass plate on the side surface of the sensor also causes the COB package to dispense with any protection glass plate, thereby making the outside dimension of the COM package smaller.

However, if the COB package is arranged to have exactly the same structural arrangement as the clear mold package, there arises the following problem.

Since the COB package is arranged in the same manner as the clear mold package to receive the sensor on the glass surface of the COB package and the receiving surface of the sensor holder which are approximately flat, position adjustment is possible. However, after position adjustment, fixing by bonding encounters a problem.

In the case of the clear mold package, the clear mold package and the sensor holder can be easily bonded and joined together with an instantaneous adhesive to have a sufficient adhesive, or bonding, strength because they are formed by molding with similar plastic materials. With a focus detecting device arranged to use the COB package, however, the glass surface and the plastic material have poor adhesive properties for each other and are not easily bondable. Besides, since it is necessary to cause an instantaneous adhesive to instantly flow to the sensor holder in the shape of a focus detecting unit, it has been impossible to confirm that the adhesive has flown to the whole sensor holder.

Therefore, it has been impossible to ensure a sufficient flow of the adhesive to cover the whole sensor holder to give a sufficient bonding strength.

Further, it is conceivable to attain a sufficient bonding strength by using an ultraviolet curable resin material for the adhesive. However, the ultraviolet curable resin excessively contracts and shrinks when it dries to harden. Therefore, if the ultraviolet curable resin is. used for bonding a focus detecting sensor after position adjustment, the position of the focus detecting sensor would be caused to deviate from the adjusted position by the contraction of the resin adhesive taking place when the resin dries and hardens.

Besides, the ultraviolet curable resin has a relatively large expansion coefficient after it dries and hardens. The ultraviolet curable resin would greatly expand and shrink according to changes in ambient temperature. Therefore, the use of the ultraviolet curable resin for bonding the focus detecting sensor is not desirable.

BRIEF SUMMARY OF THE INVENTION

The invention is directed to the solution of the problems of the prior art. It is, therefore, an object of the invention to provide a focus detecting device in which a focus detecting sensor is arranged in a COB package to permit reduction in cost and size and yet to have sufficient bonding strength and focus detecting accuracy.

To attain the above object, in accordance with an aspect of the invention, there is provided a focus detecting device which comprises a focus detecting sensor having a glass plate affixed to a surface thereof, and a holding member which holds the focus detecting sensor, wherein the holding member is provided with a first abutting surface on which the glass plate of the focus detecting sensor abuts, a second abutting surface on which a side surface of the focus detecting sensor abuts, and a groove, disposed between the first and second abutting surfaces, in which an adhesive for fixing the focus detecting sensor flows, so that the focus detecting sensor and the holding member can be reliably joined together.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

First Embodiment

Figure 1:
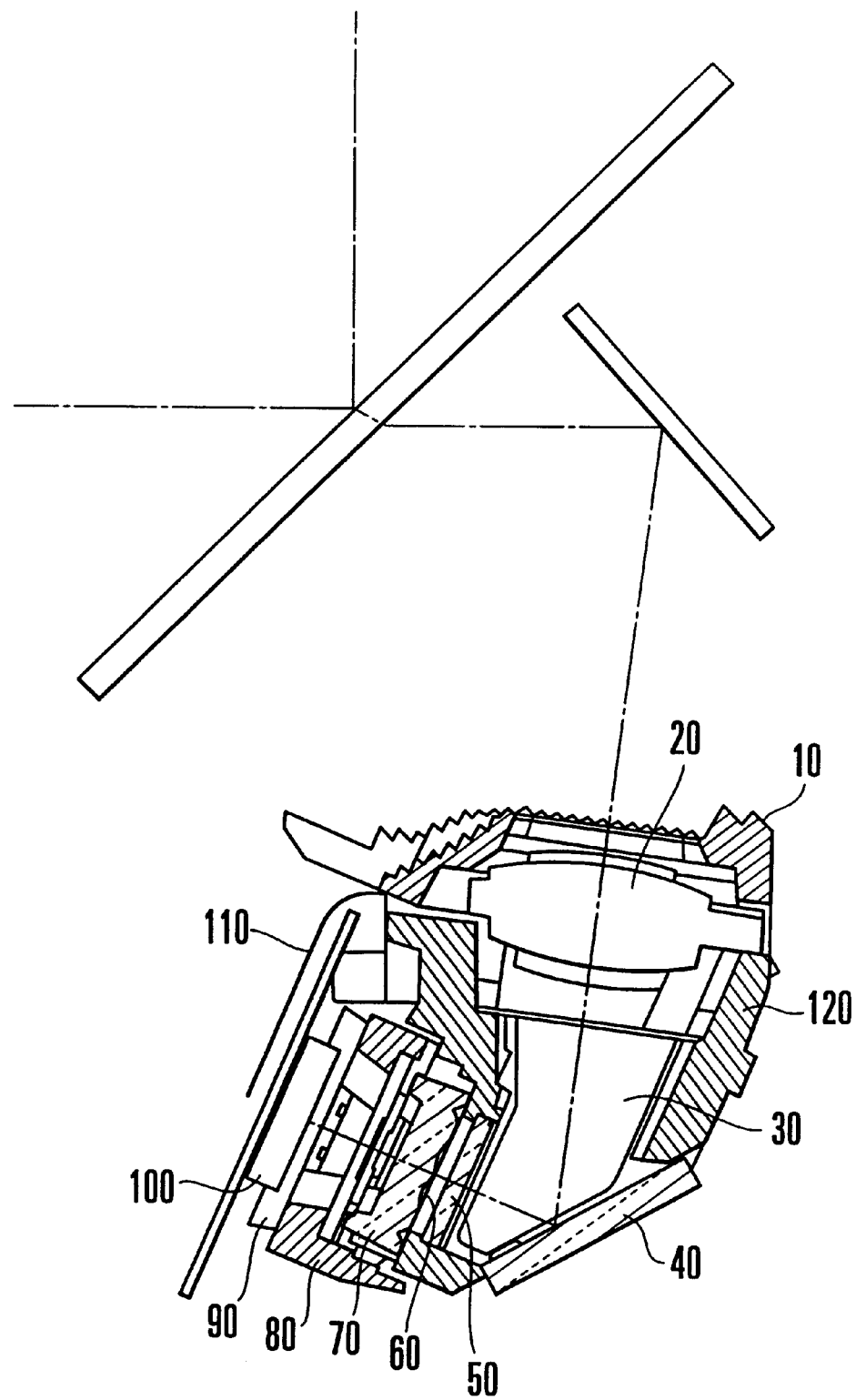
FIG. 1 is a sectional view of a focus detecting device according to a first embodiment of the invention.
Figure 2:
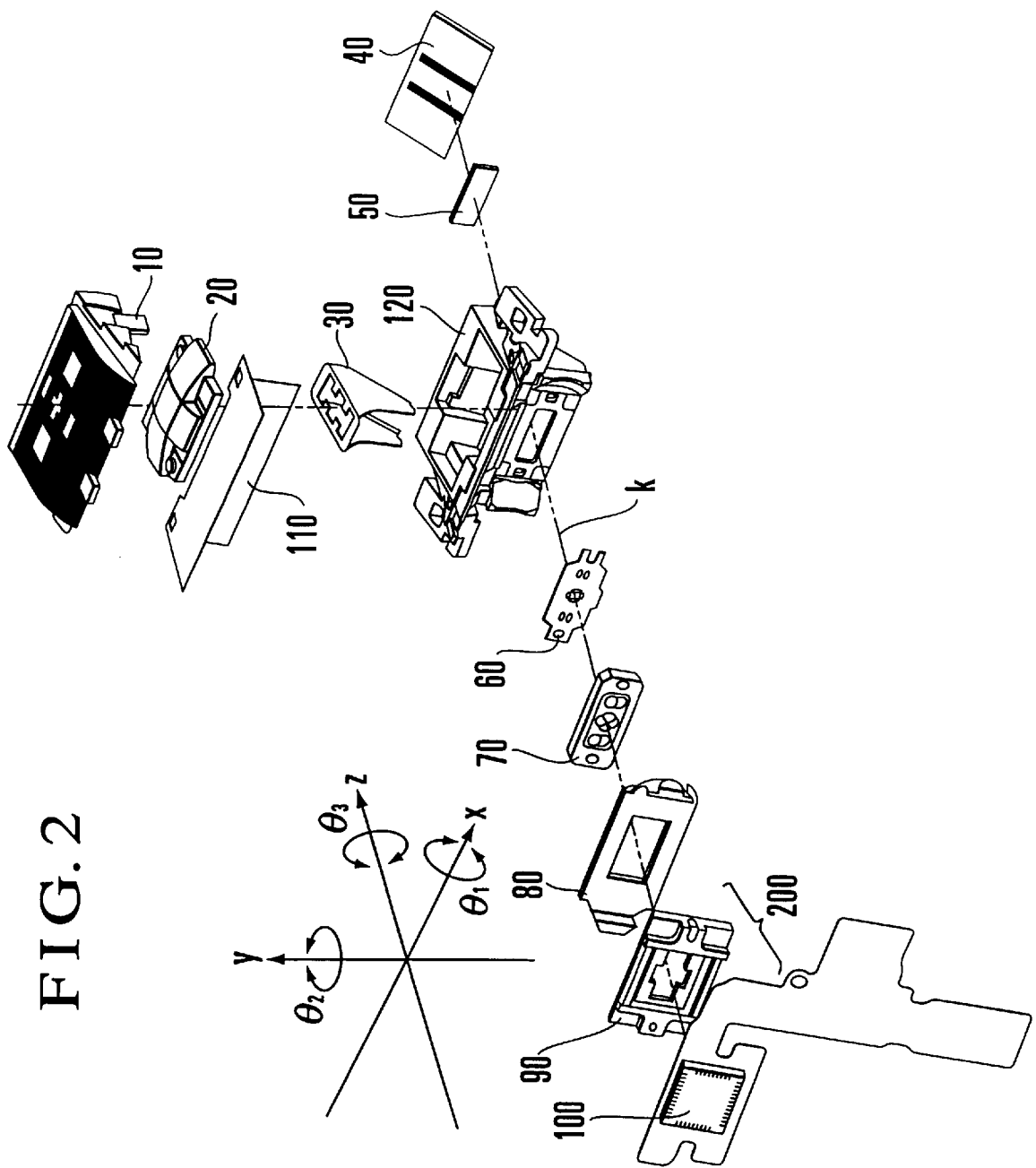
FIG. 2 is an exploded perspective view of the focus detecting device shown in FIG. 1.

FIGS. 1 and 2 are a sectional view and an exploded perspective view, respectively, showing a focus detecting device which has a plurality of distancemeasuring fields, according to a first embodiment of the invention.

Referring to FIGS. 1 and 2, reference character "k" denotes an optical axis. A field mask 10 is arranged behind an objective lens (not shown) to remove unnecessary light fluxes by splitting a distance measuring light flux. A split field lens 20 is arranged to lead an image formed on a primary imaging plane to a sensor 100 which is a light receiving means. A light blocking plate 30 is arranged to split a light flux of a center distance-measuring field and light fluxes of peripheral distance-measuring fields among a plurality of distance-measuring fields in such a way as to prevent light fluxes other than an effective light flux corresponding to each distance-measuring field from falling on the sensor 100.

A surface mirror 40 is arranged to deflect a focus detecting light flux incident upon the focus detecting unit toward the sensor 100. An infrared cut filter 50 is provided for removing infrared light. A multiple aperture diaphragm 60 is provided for splitting the focus detecting light flux. A reimaging lens 70 is an optical member having a plurality of pairs of lenses arranged to form images on the sensor 100.

An adjustment holder 80 is provided for adjusting and holding a sensor unit. A sensor holder 90 holds the sensor 100. The sensor 100 functions as a light receiving means for detecting an image in detecting focus and is composed of a plurality of paired line sensors.

A light blocking sheet 110 is arranged to cover a clearance between the focus-detecting-unit mount part of a camera and the focus detecting unit. A body block 120 serves as a holding member to hold component parts of the focus detecting unit and to block outside light.

In the structural arrangement described above, the field mask 10, the split field lens 20, the light blocking plate 30, the mirror 40, the infrared cut filter 50, the multiple aperture diaphragm 60, the reimaging lens 70, the adjustment holder 80, the sensor holder 90, the sensor 100 and the light blocking sheet 110 are all mounted on the body block 120.

The field mask 10 is positioned by means of a fitting shaft and a fitting hole to be secured to the body block 120. The split field lens 20 is attached to the body block 120 by bonding. The light blocking plate 30, the mirror 40 and the infrared cut filter 50 are secured also by bonding to the body block 120 after positioning.

The multiple aperture diaphragm 60 is secured to the reimaging lens 70 after positioning by a fitting hole and a slot provided in the multiple aperture diaphragm 60 and positioning fitting shafts provided on the reimaging lens 70. The reimaging lens 70 is secured to the body block 120 after positioning by positioning-fitting holes formed in the body block 120 and positioning-fitting shafts provided on the reimaging lens 70.

The adjustment holder 80 is provided with a pair of approximately semi-spherical convex abutting parts 81 which have one and the same axis for positioning as will be described later with reference to FIG. 4. By using the abutting parts 81 and a pair of semi-spherical concave receiving parts 123 formed on the side of the body block 120, the adjustment holder 80 is swingably positioned on the body block 120 to have the abutting parts 81 at the center of position adjustment.

The sensor holder 90 is provided with a flat part 93 for position adjustment and is slidably positioned on a sensor holder receiving surface 82 of the adjustment holder 80 at the flat part 93. The sensor 100 is secured beforehand by bonding to the sensor holder 90. The sensor 100 and the sensor holder 90 are thus arranged together to form a sensor unit.

With the sensor 100 thus secured to the sensor holder 90, the position of the sensor holder 90 is adjusted together with the adjustment holder 80 to have the optical axis, sensor inclination, etc., thereof adjusted with respect to the reimaging lens 70. After adjustment, the adjustment holder 80 is secured by bonding to the body block 120. The sensor holder 90 is then secured by bonding to the adjustment holder 80. The light blocking sheet 110 is mounted in a state of being interposed between the field mask 10 and the body block 120.

Figure 3:
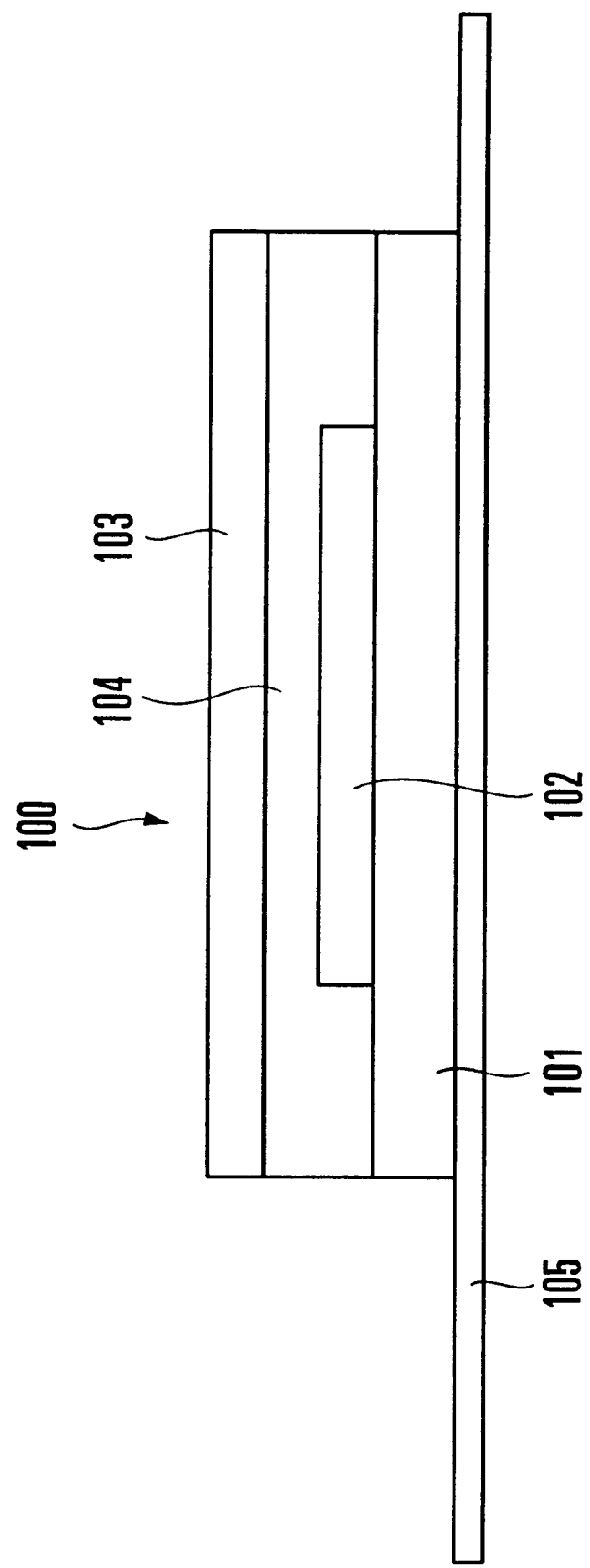
FIG. 3 is a sectional view showing the structural arrangement of a COB package according to the first embodiment of the invention.

FIG. 3 is a sectional view showing the structural arrangement of the sensor 100 in the first embodiment.

In the sensor 100, a sensor chip 102 which is a light receiving means arranged to detect an image to be used for detecting focus is mounted on a mounting base plate (substrate) 101.

A glass plate 103 is arranged in combination with the mounting base plate 101 to have the sensor chip 102 interposed in between them.

A void space left between the mounting base plate 101 and the glass plate 103 is filled with a transparent resin 104. The transparent resin 104 is allowed to harden in a state of enveloping the sensor chip 102. With the transparent resin 104 hardened, the mounting base plate 101 and the glass plate 103 are fixed integrally with each other.

The sensor 100 is provided with a flexible printed circuit board 105. Hereinafter, the arrangement of a sensor in the above-stated manner will be called a COB (chip-on-board) package. The COB package is compact, has little amount of dust mixed therein and does not easily have air foams therein. Therefore, the COB package permits improvement in yield and reduction of production cost.

Figure 4:
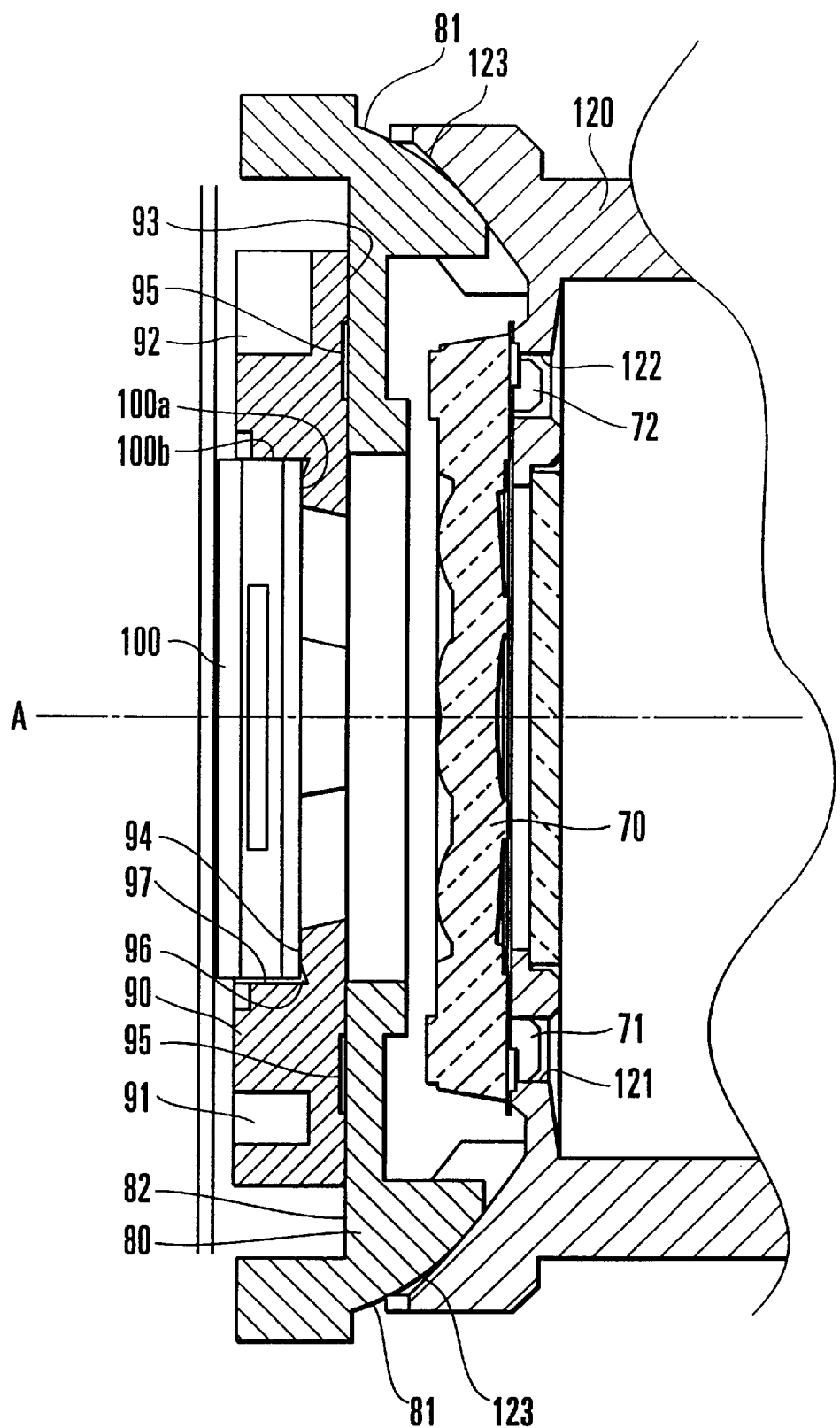
FIG. 4 is a sectional view showing the details of essential parts of the focus detecting device according to the first embodiment of the invention.

FIG. 4 is a sectional view showing the arrangement from the reimaging lens 70 through the sensor 100 of the focus detecting device using the COB package.

The reimaging lens 70 is provided with a pair of positioning fitting shafts 71 and 72. The body block 120 is provided with a fitting hole 121 and a slot 122 for positioning the reimaging lens 70.

The positioning fitting shaft 71 of the reimaging lens 70 is fitted into the reimaging-lens-positioning fitting hole 121 of the body block 120 to restrict a parallel movement of the reimaging lens 70 within a plane perpendicular to an optical axis A of the reimaging lens 70. The other positioning fitting shaft 72 of the reimaging lens 70 is fitted into the reimaging-lens-positioning slot 122 of the body block 120 to restrict a rotatory movement of the reimaging lens 70 relative to the reimaging-lens-positioning fitting hole 121 on the plane perpendicular to the optical axis A of the reimaging lens 70.

The reimaging lens 70 is bonded and secured to the body block 120 by applying an adhesive from one side of each of the reimaging-lens-positioning fitting hole 121 and the reimaging-lens positioning slot 122 of the body block 120 opposite to the mounting surface thereof for the reimaging lens 70. The adhesive is thus arranged to be led to the bonding-and-fixing part of the reimaging lens 70 and that of the body block 120.

The bonding-and-fixing part of the reimaging lens 70 and that of the body block 120 are located around the positioning fitting shafts 71 and 72 and the reimaging-lens-positioning fitting hole 121 and the reimaging-lens positioning slot 122 of the body block 120.

The adjustment holder 80 is positioned with respect to the body bock 120 by swinging on the pair of approximately semi-spherical convex abutting parts 81 which have one and the same axis for positioning and also the pair of semi-spherical concave receiving parts 123 formed on the side of the body block 120.

The adjustment holder 80 is provided with the sensor holder receiving surface 82 which is arranged to receive the flat part 93 of the sensor holder 90.

The sensor holder 90 is provided with fitting engagement holes 91 and 92 for position adjustment. In positioning and adjusting the sensor 100, positioning adjustment tool pins (not shown) are fitted into the fitting engagement holes 91 and 92 in a manner as will be described later.

The sensor holder 90 is swingably positioned with respect to the adjustment holder 80 by abutting the flat part 93 thereof on the sensor holder receiving surface 82 of the adjustment holder 80. The sensor holder 90 is provided with a sensor receiving surface 94, a sensor holder bonding groove 95 for applying an adhesive to join the adjustment holder 80 and the sensor holder 90 together, a sensor bonding groove 96 for applying an adhesive to join the sensor holder 90 and the sensor 100 together, and a sensor-end-surface abutting part 97 which is formed to encompass the outside of the sensor 100.

The sensor 100 is arranged to have its position in the direction of the optical axis A determined with a sensor surface 100a abutting on the sensor receiving surface 94 of the sensor holder 90. When the adhesive is applied to the sensor bonding groove 96 of the sensor holder 90 under this condition, the adhesive is led to a bonding-and-fixing part between the sensor holder 90 and the sensor 100.

The bonding-and-fixing part between the sensor holder 90 and the sensor 100 includes a portion located between the abutting receiving surface 94 of the sensor holder 90 and the sensor surface 100a of the sensor 100 and a portion located between the sensor-end-surface abutting part 97 of the sensor holder 90 and a sensor end surface 100b of the sensor 100. The bonding-and-fixing part thus extends over the whole length of the sensor end surface 100b of the sensor 100.

Since the sensor surface 100a of the sensor 100 which abuts on the sensor receiving surface 94 of the sensor holder 90 is a sheet glass surface, it is impossible to have a sufficient bonding strength with an instantaneous adhesive or the like used for bonding. In view of this, the sensor-end-surface abutting part 97 of the sensor holder 90 is formed to encompass the outside end surface 100b of the sensor 100 and to be stuck not only to the glass plate 103 of the sensor 100 but also to the end surface of the transparent resin 104 and that of the mounting base plate (substrate) 101. By this arrangement, the clearances between them are fixed by bonding to ensure a sufficient bonding strength.

According to the conventional arrangement, in bonding and fixing the sensor holder 90 and the sensor 100 to each other, the bonding work must be performed with the sensor in a position-adjusted state. Therefore, it has been hardly possible to find an adequate flow of an adhesive to the bonding-and-fixing parts of the sensor holder 90 and the sensor 100.

In the case of the first embodiment, on the other hand, the adequate flow of the adhesive can be confirmed when the adhesive is applied as the sensor holder 90 and the sensor 100 can be joined together by bonding before they are assembled. The sensor 100 in the first embodiment, therefore, has a sufficient bonding strength.

Further, the bonding work can be more adequately carried out by using a transparent or semitransparent material for the sensor holder 90 as use of the material permits visual confirmation of the flow of the adhesive to the bonding-and-fixing parts of the sensor holder 90 and the sensor 100.

The position of the sensor 100 tends to vary due to contraction of the adhesive when the adhesive dries. In the case of the first embodiment, however, the bonding work on the sensor holder 90 and the sensor 100 can be performed before they are assembled. Therefore, the position of the sensor 100 can be adjusted in a stable state after the adhesive completely dries.

The sensor 100 and the sensor holder 90 are thus secured by bonding to each other to form a sensor unit 200 beforehand. After the sensor 100 and the sensor holder 90 are thus joined together by bonding, the position of the sensor 100 relative to the reimaging lens 70 is variously adjusted.

To adjust the optical axis and inclination of the sensor 100, the position adjusting tool pins (not shown) are fitted into the fitting engagement holes 91 and 92 of the sensor holder 90. Then, in a state of having the adjustment holder 80 and the sensor holder 90 movable to an amount corresponding to the moving amount of the tool pins, the tool pins are moved. With the tool pins moved, the pair of approximately semispherical convex abutting parts 81 having one and the same axis for adjusting the position of the adjustment holder 80 are swung relative to the pair of approximately semispherical concave adjustment-holder-abutting receiving parts 123 formed in the body block 120, so as to adjust the inclinations in directions $\theta_1$ and $\theta_2$ (see FIG. 2) of the sensor 100 with respect to the body block 120. Further, the abutting surface 93 of the sensor holder 90 is swung relative to the abutting receiving surface 82 of the adjustment holder 80, so as to adjust the positions in directions "x" and "y" (see FIG. 2) and the inclination in a direction $\theta_3$ (see FIG. 2) of the sensor 100 with respect to the body block 120. It is to be noted that a direction "z" shown in FIG. 2 coincides with the optical axis "k".

Upon completion of various adjustment work on the sensor 100, the adjustment holder 80 and the body block 120 are bonded and fixed to each other, and the adjustment holder 80 and the sensor holder 90 are bonded and fixed to each other.

The adjustment holder 80 is joined by bonding onto the body block 120 by applying an adhesive between the abutting part 81 of the adjustment holder 80 and the abutting receiving surface 123 of the body block 120. The adjustment holder 80 and the body block 120 are arranged such that, when the adhesive is applied, they allow the adhesive to flow to their bonding-and-fixing parts.

The bonding-and-fixing parts of the adjustment holder 80 and the body block 120 are located between the abutting part 81 of the adjustment holder 80 and the abutting receiving surface 123 of the body block 120.

The adjustment holder 80 is joined by bonding onto the sensor holder 90 by applying an adhesive to a space between the sensor holder receiving surface 82 of the adjustment holder 80 and the bonding groove 95 provided on the flat part 93 of the sensor holder 90.

The adjustment holder 80 and the sensor holder 90 are arranged such that, when the adhesive is applied, they allow the adhesive to flow to their bonding-and-fixing parts.

The bonding-and-fixing parts of the adjustment holder 80 and the sensor holder 90 are located between the sensor holder receiving face 82 of the adjustment holder 80 and the flat part 93 and the bonding groove 95 of the sensor holder 90.

As described above, the adjustment holder 80 and the body block 120 are joined together and the adjustment holder 80 and the sensor holder 90 are joined together by bonding after completion of various position adjustment work on the sensor 100 relative to the reimaging lens 70. By this bonding arrangement, all parts from the adjustment holder 80 through the sensor 100 are integrally secured by bonding to the body block 120, thereby making it possible to adequately lead a distance measuring light flux from the objective lens (not shown) to the sensor 100.

Figure 5:
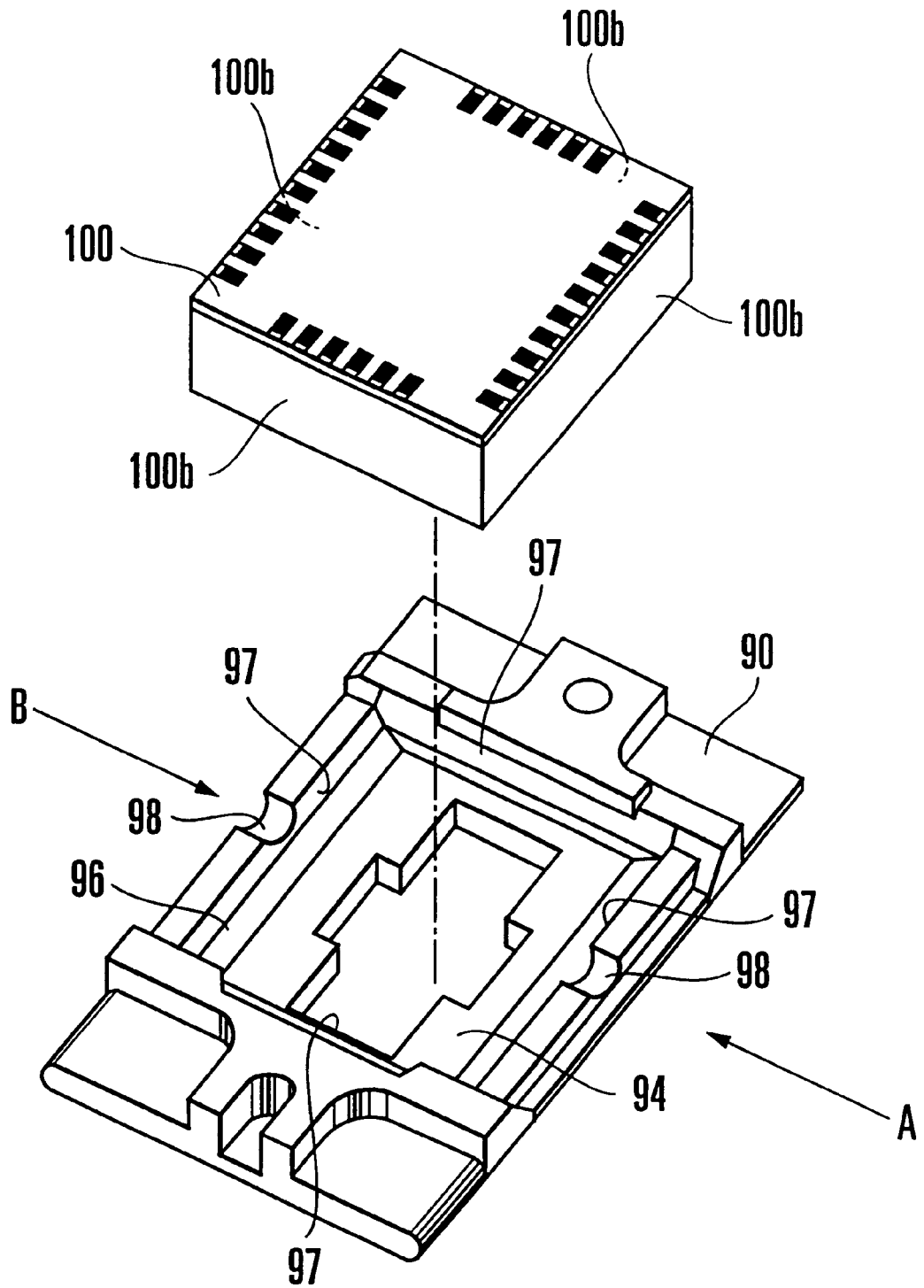
FIG. 5 is a perspective view showing the method of bonding and fixing the COB package in the first embodiment of the invention.

FIG. 5 is a perspective view showing the method of applying the adhesive by injection in bonding together the COB package and the sensor holder in the first embodiment.

Referring to FIG. 5, the sensor holder 90 is provided with the sensor receiving surface 94 and the sensor-end-surface abutting part 97 which is formed to encompass the sensor end surface 100$b$ of the sensor 100. These parts 94 and 97 are used in positioning the sensor 100.

When the adhesive is injected from adhesive injection ports 98 of the sensor holder 90 with the sensor 100 positioned, the adhesive is led by the bonding groove 96 to the bonding-and-fixing parts of the sensor holder 90 and the sensor 100.

The bonding-and-fixing parts of the sensor holder 90 and the sensor 100 are located at a part between the sensor receiving surface 94 of the sensor holder 90 and the sensor surface 100$a$ of the sensor 100 and a part between the sensor-end-surface abutting part 97 of the sensor holder 90 and the sensor end surface 100$b$ of the sensor 100. The bonding-and-fixing parts thus extend to cover the whole end surface 100$b$ of the sensor 100.

Since the sensor surface 100$a$ of the sensor 100 which abuts on the sensor receiving surface 94 of the sensor holder 90 is a sheet glass surface, it is impossible to have a sufficient bonding strength with an instantaneous adhesive or the like used for bonding. In view of this, the sensor-end-surface abutting part 97 of the sensor holder 90 is formed to encompass the outside end surface 100$b$ of the sensor 100 and to be stuck not only to the glass plate 103 of the sensor 100 but also to an end surface of the transparent resin 104 and that of the mounting base plate 101. For this purpose, the adhesive is applied sidewise to the sensor holder 90 in the directions of arrows A and B. This bonding arrangement gives a sufficient bonding strength.

Second Embodiment

Figure 6:
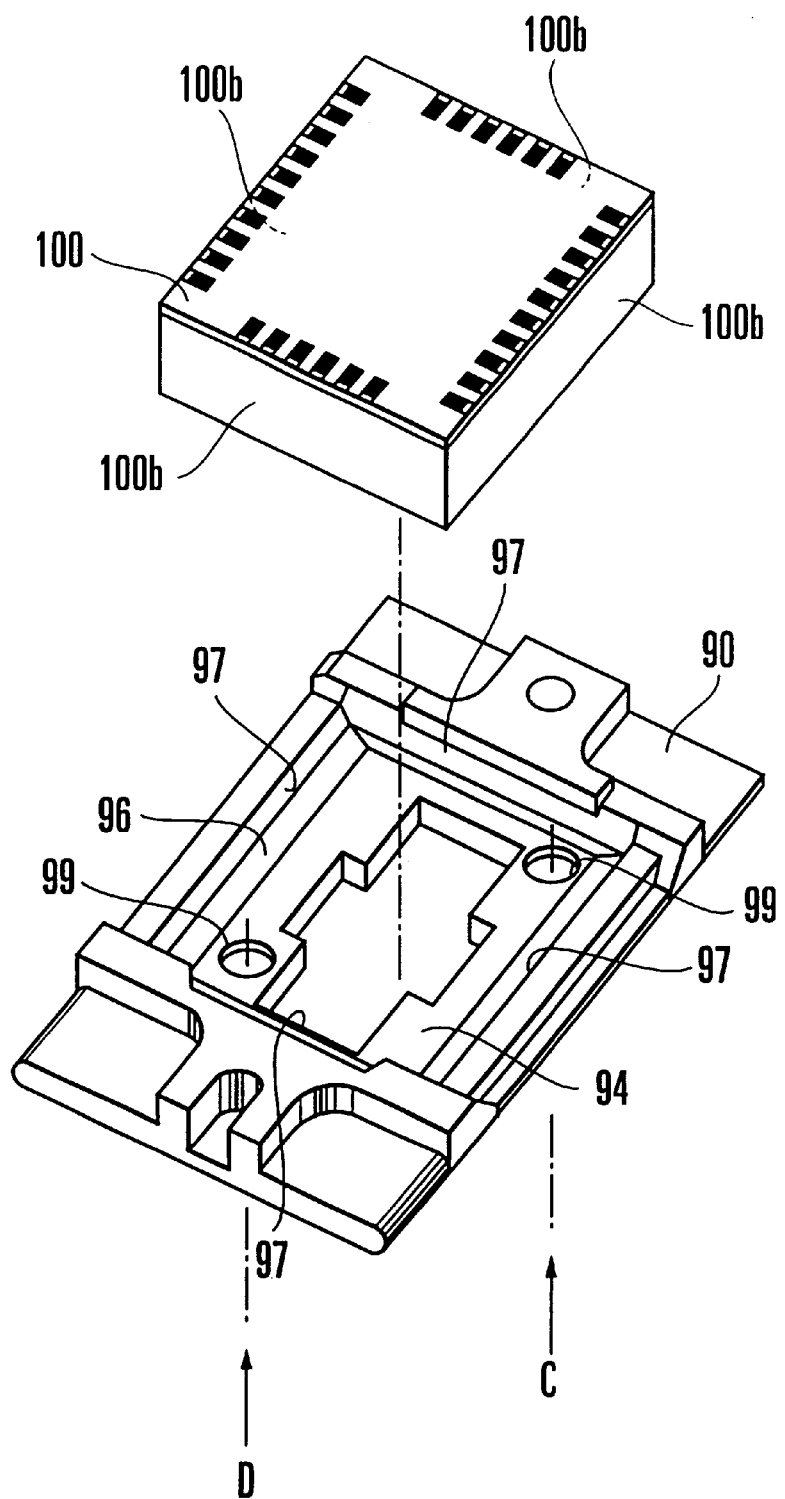
FIG. 6 is a perspective view showing the method of bonding and fixing the COB package in a second embodiment of the invention.
Figure 7A:
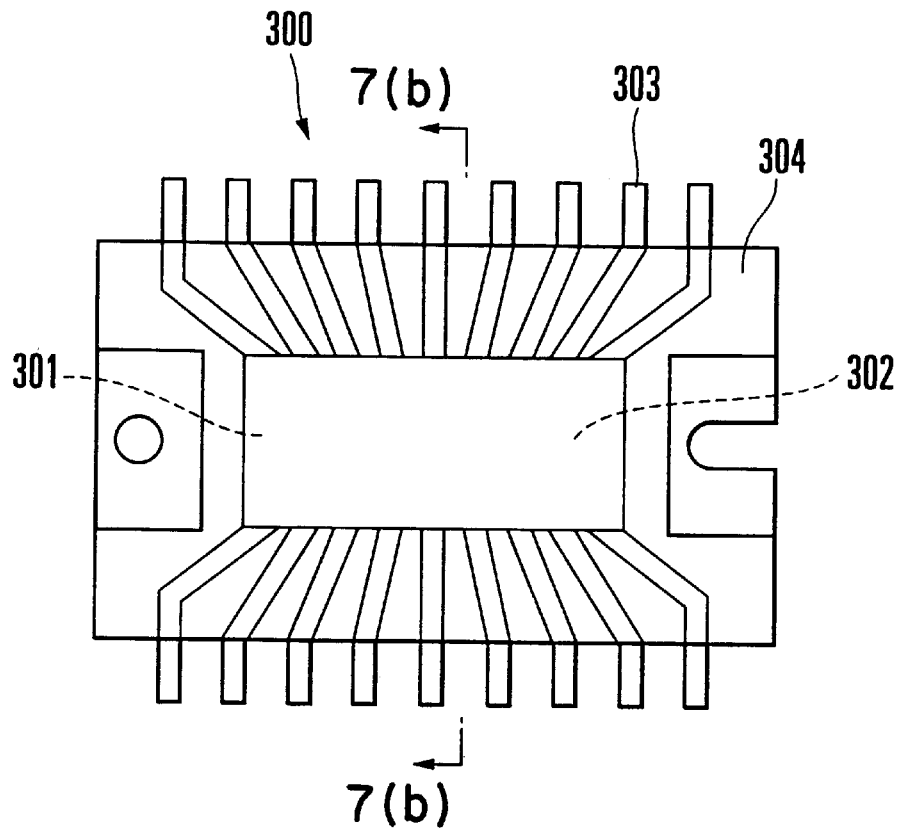
FIGS. 7(a) and 7(b) are a plan view and a sectional view taken along a line A–A' of FIG. 7(a), respectively, showing the arrangement of a conventional clear mold type focus detecting sensor.
Figure 7B:
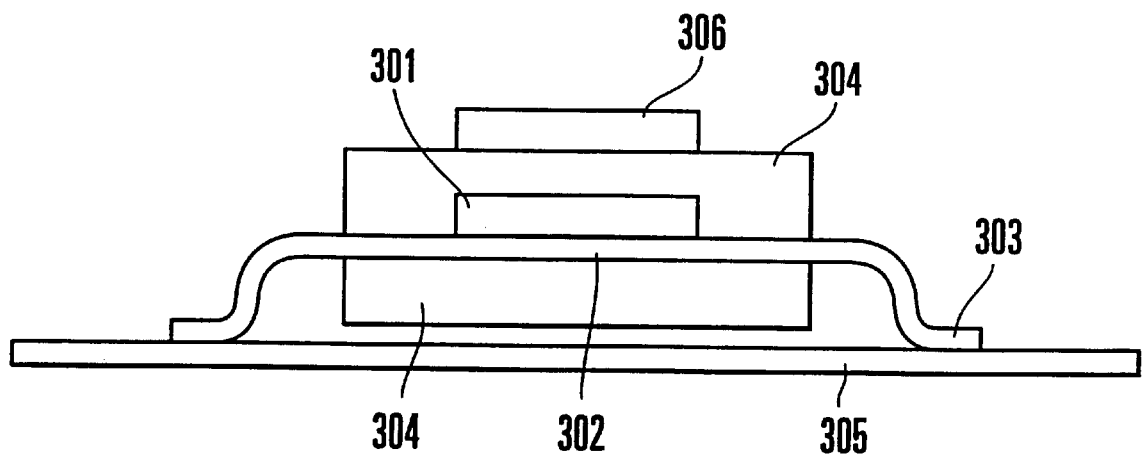

FIG. 6 is a perspective view showing the method of applying the adhesive by injection in bonding and joining together the COB package and the sensor holder of a focus detecting device in a second embodiment of the invention.

Referring to FIG. 6, the sensor holder 90 is provided with the sensor receiving surface 94 and the sensor-end-surface abutting part 97 which is formed to encompass the outside end surface 100$b$ of the sensor 100. These parts 94 and 97 are used in positioning the sensor 100.

When the adhesive is injected from adhesive injection ports 99 of the sensor holder 90 with the sensor 100 positioned, the adhesive reaches the bonding groove 96 to be led by the bonding groove 96 to the bonding-and-fixing parts of the sensor holder 90 and the sensor 100.

The bonding-and-fixing parts of the sensor holder 90 and the sensor 100 are located at a part between the sensor receiving surface 94 of the sensor holder 90 and the sensor surface 100a of the sensor 100 and a part between the sensor-end-surface abutting part 97 of the sensor holder 90 and the sensor end surface 100b of the sensor 100. The bonding-and-fixing parts thus extend to cover the whole end surface 100b of the sensor 100.

Since the sensor surface 100a of the sensor 100 which abuts on the sensor receiving surface 96 of the sensor holder 90 is a sheet glass surface, it is impossible to have a sufficient bonding strength with an instantaneous adhesive or the like used for bonding. In view of this, the sensor-end-surface abutting part 97 of the sensor holder 90 is formed to encompass the outside end surface 100b of the sensor 100 and to be stuck not only to the glass plate 103 of the sensor 100 but also to the end surface of the transparent resin 104 and that of the mounting base plate 101. For this purpose, the adhesive is applied from the sensor surface side of the sensor holder 90 as indicated by arrows C and D. This bonding arrangement gives a sufficient bonding strength.

The arrangement for applying the adhesive from the sensor surface side of the sensor holder 90 as indicated by the arrows C and D facilitates bonding work as it permits provision of one or more adhesive applying ports on one and the same surface of the sensor holder 90.

While the structural arrangement for positioning and fixing the COB package has been described in respect of focus detecting devices, the arrangement according to the invention is not limited to focus detecting devices but is applicable also to positioning and fixing work on optical members in general.

What is claimed is:

1. A focus detecting device comprising:
    a) a focus detecting sensor having a glass plate affixed to a surface thereof; and
    b) a holding member which holds said focus detecting sensor, wherein said holding member is provided with a first abutting surface on which the glass plate of said focus detecting sensor abuts, a second abutting surface on which a side surface of said focus detecting sensor abuts, and a groove, disposed between said first and second abutting surfaces, in which an adhesive for fixing said focus detecting sensor flows.

2. A focus detecting device according to claim 1,
    wherein said focus detecting sensor includes a sensor chip mounted on a substrate, a glass plate and a transparent resin filling a space between said sensor chip and said glass plate.

3. A focus detecting device according to claim 2,
    wherein said focus detecting sensor has said transparent resin exposed at the side surface thereof.

4. A focus detecting device according to claim 3,
    wherein the adhesive which is injected into said groove acts to bond together said holding member and said transparent resin exposed at the side face of said focus detecting sensor.

5. A focus detecting device according to claim 1,
    wherein said holding member is provided with an injection port for injecting the adhesive.

6. A focus detecting device according to claim 5,
    wherein said injection port is formed in said first abutting surface.

7. A focus detecting device according to claim 5,
    wherein said injection port is formed in said second abutting surface.

8. An apparatus having a focus detecting device, comprising:
    a) a focus detecting sensor having a glass plate affixed to a surface thereof; and
    b) a holding member which holds said focus detecting sensor, wherein said holding member is provided with a first abutting surface on which the glass plate of said focus detecting sensor abuts, a second abutting surface on which a side surface of said focus detecting sensor abuts, and a groove, disposed between said first and second abutting surfaces, in which an adhesive for fixing said focus detecting sensor flows.

9. An apparatus according to claim 8, wherein said focus detecting sensor includes a sensor chip mounted on a substrate, a glass plate and a transparent resin filling a space between said sensor chip and said glass plate.

10. An apparatus according to claim 9, wherein said focus detecting sensor has said transparent resin exposed at the side surface thereof.

11. An apparatus according to claim 10, wherein the adhesive which is injected into said groove acts to bond together said holding member and said transparent resin exposed at the side face of said focus detecting sensor.

12. An apparatus according to claim 8, wherein said holding member is provided with an injection port for injecting the adhesive.

13. An apparatus according to claim 12, wherein said injection port is formed in said first abutting surface.

14. An apparatus according to claim 12, wherein said injection port is formed in said second abutting surface.

15. A focus detecting device comprising:
    a) a focus detecting sensor;
    b) a first holding member which directly holds said focus detecting sensor;
    c) a second holding member which holds at least an optical element; and
    d) a position adjusting member disposed between said first holding member and said second holding member, wherein a position within a plane perpendicular to an optical axis and an inclination in a rotating direction around the optical axis of said focus detecting sensor are adjusted by varying a positional relationship between said position adjusting member and said first holding member.

16. A focus detecting device comprising:
    a) a focus detecting sensor;
    b) a first holding member which directly holds said focus detecting sensor;
    c) a second holding member which holds at least an optical element; and
    d) a position adjusting member disposed between said first holding member and said second holding member, wherein a position within a plane perpendicular to an optical axis and an inclination in a rotating direction around the optical axis of said focus detecting sensor are adjusted by varying a positional relationship between said position adjusting member and said first holding member, and respective inclinations in rotating directions around two axes perpendicular to the optical axis of said focus detecting sensor are adjusted by varying a positional relationship between said position adjusting member and said second holding member.

17. An apparatus having a focus detecting device, comprising:
   a) a focus detecting sensor;
   b) a first holding member which directly holds said focus detecting sensor;
   c) a second holding member which holds at least an optical element; and
   d) a position adjusting member disposed between said first holding member and said second holding member,
      wherein a position within a plane perpendicular to an optical axis and an inclination in a rotating direction around the optical axis of said focus detecting sensor are adjusted by varying a positional relationship between said position adjusting member and said first holding member.

18. An apparatus having a focus detecting device, comprising:
   a) a focus detecting sensor;
   b) a first holding member which directly holds said focus detecting sensor;
   c) a second holding member which holds at least an optical element; and
   d) a position adjusting member disposed between said first holding member and said second holding member,
      wherein a position within a plane perpendicular to an optical axis and an inclination in a rotating direction around the optical axis of said focus detecting sensor are adjusted by varying a positional relationship between said position adjusting member and said first holding member, and respective inclinations in rotating directions around two axes perpendicular to the optical axis of said focus detecting sensor are adjusted by varying a positional relationship between said position adjusting member and said second holding member.

* * * * *

UNITED STATES PATENT AND TRADEMARK OFFICE
CERTIFICATE OF CORRECTION

PATENT NO.   : 6,465,769 B1  Page 1 of 1
DATED        : October 15, 2002
INVENTOR(S)  : Hiroshi Sakurai It is certified that error appears in the above-identified patent and that said Letters Patent is hereby corrected as shown below:

<u>Column 4,</u>
Line 12, delete "distancemeasuring" and insert -- distance-measuring --.

Signed and Sealed this

Fourteenth Day of October, 2003

JAMES E. ROGAN
*Director of the United States Patent and Trademark Office*